3,573,064
RECONSTITUTABLE DRY COCONUT POWDER
Peter P. Noznick, Evanston, and Robert H. Bundus, Riverside, Ill., assignors to Beatrice Foods Co., Chicago, Ill.
No Drawing. Continuation-in-part of application Ser. No. 603,093, Dec. 20, 1966. This application Aug. 29, 1968, Ser. No. 756,316
Int. Cl. A23l 1/00
U.S. Cl. 99—125
18 Claims

ABSTRACT OF THE DISCLOSURE

Coconut meat is removed from the shell, ground to a particle size of not over 200 microns, preferably in the presence of water, and fibrous material separated from the milk. To the milk is added an emulsifier and a protein and the milk is then dried, e.g. by spray drying. To reduce tackiness dextrin can be added prior to drying. The coconut milk can be concentrated prior to drying.

---

The present application is a continuation-in-part of application 603,093 filed Dec. 20, 1966 and now abandoned.

The present invention relates to the preparation of dry coconut powder.

It is very difficult to spray-dry coconut milk because of the high fat and sugar content. Furthermore, dried coconut milk is normally difficult to reconstitute as a stable liquid emulsion.

It is an object of the present invention to manufacture a dry coconut product which when reconstituted with water possesses emulsion stability.

Another object is to render coconut milk readily spray driable.

Still further objects and the entire scope of applicability of the present invention will become apparent from the detailed description given hereinafter; it should be understood, however, that the detailed description and specific examples, while indicating preferred embodiments of the invention, are given by way of illustration only, since various changes and modifications within the spirit and scope of the invention will become apparent to those skilled in the art from this detailed description.

It has now been found that these objects can be attained by removing the coconut meat from the shell and reducing the particle size to not greater than 200 microns. While dry grinding can be employed, preferably water is added prior to grinding. The amount of water can be sufficient to provide 99 to 20% solids by weight prior to grinding but preferably is sufficient to provide 25% solids.

After grinding the fibrous material is removed from the liquid portion, hereinafter described as coconut milk. The solids can be removed by filtering, e.g. through a filter press, or by other conventional means. At this stage the particle size of the coconut milk is 30 microns or less. This is important in order to eliminate physical detection of cellulose by oral detection or mouth feel.

To the coconut milk there is then added an emulsifier. The preferred emulsifiers are partial esters of higher fatty acids with mono or polyglycerides. Thus there can be used glycerol monopalmitate, glycerol monostearate, glycerol monooleate, glycerol mono myristate, glycerol monolaurate, decaglycerol monostearate, decaglycerol monooleate, decaglycerol monopalmitate, decaglycerol mono myristate, triglycerol monostearate, triglycerol monopalmitate, triglycerol monostearate, triglycerol monopalmitate, hexaglycerol monostearate, hexaglycerol dipalmitate. Mixed partial esters can also be used e.g. a mixed glycerol monopalmitate (90%) glycerol dipalmitate (10%). Myverol 1807 which is a partial glyceride derived from cottonseed oil and is essentially 90% glycerol mono mixed stearate and palmitate and 10% glycerol di mixed stearate and palmitate is one of the most preferred emulsifiers. Another of the most preferred esters is Drewpol 10-1-S (decaglycerol monostearate).

As indicated the hard emulsifiers, i.e., stearates and palmitates are preferred. As is well recognized in the art commercial stearates normally contain some palmitates and commercial palmitates contain some stearates. Such commercial materials are equally as effective as the chemically pure materials.

It is also essential to add to the coconut milk a protein to provide emulsion stability of the fat-sugar system. The protein should be bland in flavor and preferably white in color such as sodium caseinate, soy protein, lactalbumin and egg protein. Sodium caseinate is preferred.

The mixture is preferably homogenized to obtain maximum fat particle size reduction and then the product is dried by normal dry procedures such as spray drying, box drying or tower drying. The invention is particularly adapted to spray drying which procedure is normally very difficult to accomplish with conventional coconut milk as pointed out supra.

Unless otherwise indicated all parts and percentages are by weight.

The protein is normally added in an amount of 0.2–1.0% of the coconut milk (wet basis), preferably 0.5%, and the emulsifying agent is added in an amount of 0.5–3% (based on the dry ingredients), preferably 1%.

The coconut milk employed usually has 16–22% total solids but this can be varied. Generally finer grinding gives a higher solids content for example.

The dried product of the present invention when reconstituted with water provides a coconut milk with emulsion stability and a fresh coconut taste.

The homogenizing can be accomplished at widely varying pressures, e.g. from 1200 to 3000 p.s.i.

To eliminate the tacky characteristics on drying due to the sucrose present in coconut milk it is desirable to add a filler such as corn solids, e.g. dextrin in an amount of from 1 to 25% corn syrup solids based on the total solids.

EXAMPLE 1

Coconuts were removed from the shell. The meat was ground with water, there being used sufficient water to provide 25% total solids (prior to grinding). After grinding to a particle size of not over 200 microns the fibrous material was removed by a filter press to give a coconut milk having a particle size of 30 microns or less. To the milk was added 0.5% by weight sodium caseinate on a wet basis and 2% by weight of Myverol 1807 (dry basis).

The coconut milk was then homogenized at 1800 to 2000 p.s.i. with a Gaulin homogenizer and spray dried (inlet temperature 300° F., outlet temperature 180° F.) to give a spray dried powder which was readily reconstitutable with water to give coconut milk, e.g. employing 82 pounds of water with 18 pounds of the spray dried powder, having a fresh coconut taste and excellent emulsion stability.

EXAMPLE 2

The procedure of Example 1 was repeated but the emulsifier employed was 2% Drewpol 10-1-S (dry basis) to obtain a similar product.

EXAMPLE 3

The procedure of Example 2 was repeated but only 1% of Drewpol 10-1-S was employed. The resulting spray dried product was readily reconstitutable with water to give a coconut milk having a fresh coconut flavor.

EXAMPLE 4

The procedure of Example 1 was repeated but there were added just prior to homogenization 20% of Frodex 24 (corn syrup having a D.E. of 24) based on the total solids. The spray dried product was less tacky than that of Example 1.

To further improve emulsion stability, the coconut milk containing ground cellulose is digested with cellulose enzyme. The cellulose is also rendered more susceptible to size reduction by grinding after such digestion. The cellulose enzymes are inactivated by a brief heating prior to the homogenization.

To improve the efficiency of the spray drying operation it is desirable to concentrate the homogenized product prior to drying. Concentration is normally to 30 to 60% solids, preferably 40 to 50% solids.

Concentration can be accomplished with the aid of a vacuum, e.g. 26 to 29.5 inches of mercury, or by freeze concentration, e.g. at 0 to −20° F. In freeze concentrating the ice formed is removed, e.g. by centrifuging. The ice can then be melted and any residual fat therein removed and added back to the product with rehomogenization. It is not essential, however, to add back the fat which is removed in freeze concentrating.

EXAMPLE 5

Coconuts were treated in the same manner as in Example 1 through the homogenization step. Then the homogenized coconut milk was concentrated under a vacuum of 27.5 inches at 120° F. to 45% solids and the mixture spray dried as in Example 1 to give a spray dried powder which was readily reconstitutable with water to give coconut milk having excellent emulsion stability.

EXAMPLE 6

The procedure of Example 5 was repeated except that the vacuum was 29.5 inches and the water was removed at 80° F. until the solids were 40%. A product similar to that prepared in Example 5 was obtained.

EXAMPLE 7

Coconut milk prepared as set forth in Example 1. The homogenized milk was cooled to −10° F. and the ice centrifuged out. The residue contained 50% solids. It was rehomogenized and then spray dried to give a powder which was readily reconstitutable with water to give a coconut milk having excellent emulsion stability.

In Example 7 the first homogenization step can be omitted.

What is claimed is:

1. Dry coconut milk powder containing added protein in an amount sufficient to provide emulsion stability and an emulsifier selected from the group consisting of partial esters of glycerol and polyglycerol with a higher fatty acid, said powder being characterized by being reconstitutable in water to give a synthetic coconut milk with a fresh coconut taste.

2. The product of claim 1 reconstituted with water to give a synthetic coconut milk.

3. The product of claim 1 including dextrin in an amount sufficient to reduce tackiness.

4. A product according to claim 1 wherein the protein is selected from the group consisting of sodium caseinate, lactalbumin, soy protein and egg protein.

5. A product according to claim 1 wherein the protein is sodium caseinate and the emulsifier consists essentially of the glycerol mono ester of a saturated fatty acid having 16–18 carbon atoms.

6. A product according to claim 1 wherein the protein is sodium caseinate and the emulsifier consists essentially of decaglycerol monostearate.

7. A process of preparing the product of claim 1 comprising grinding coconut meat, filtering to remove particles over 30 microns, adding the protein and emulsifier and drying the product.

8. A process according to claim 7 wherein the drying is spray drying.

9. A process according to claim 7 wherein the grinding is carried out with the aid of added water.

10. A process according to claim 9 wherein the grinding is carried out to a particle size of not over 200 microns.

11. A process according to claim 7 wherein the grinding is carried out to a particle size of not over 200 microns.

12. A process according to claim 11 wherein the product after grinding is homogenized.

13. A process according to claim 12 wherein prior to homogenizing there is added a dextrin.

14. A process according to claim 12 wherein the protein is sodium caseinate and is added in an amount of 0.2 to 1.0% of the weight of the coconut milk.

15. A process according to claim 7 comprising concentrating the mixture to 30 to 60% by weight before drying.

16. A process according to claim 15 wherein the drying is spray drying.

17. A product according to claim 1 wherein the added protein is selected from the group consisting of sodium caseinate, lactalbumen, soy protein and egg protein and is added in an amount of 0.2 to 1.0% of the weight of the original coconut milk.

18. A process of preparing the product of claim 1 comprising grinding coconut meat, filtering to remove particles over 30 microns and to provide a coconut milk, adding the protein in an amount of 0.2 to 1.0% by weight of the coconut milk, adding the emulsifying agent in an amount of 0.5 to 3% of the weight of the total solids and drying the product.

References Cited

UNITED STATES PATENTS

| | | | |
|---|---|---|---|
| 2,887,390 | 5/1959 | Coulter et al. | 99—203 |
| 2,931,730 | 4/1960 | Schram | 99—118 |
| 3,271,165 | 9/1966 | Hanson | 99—118 |
| 3,351,531 | 11/1967 | Noznick | 167—83 |
| 3,117,878 | 1/1964 | Anderson | 99—206 |

FOREIGN PATENTS

| | | | |
|---|---|---|---|
| 108,302 | 1957 | Pakistan | 99—125X |

LIONEL M. SHAPIRO, Primary Examiner

R. B. ANDEWELT, Assistant Examiner

U.S. Cl. X.R.

99—203, 206